Patented July 15, 1947

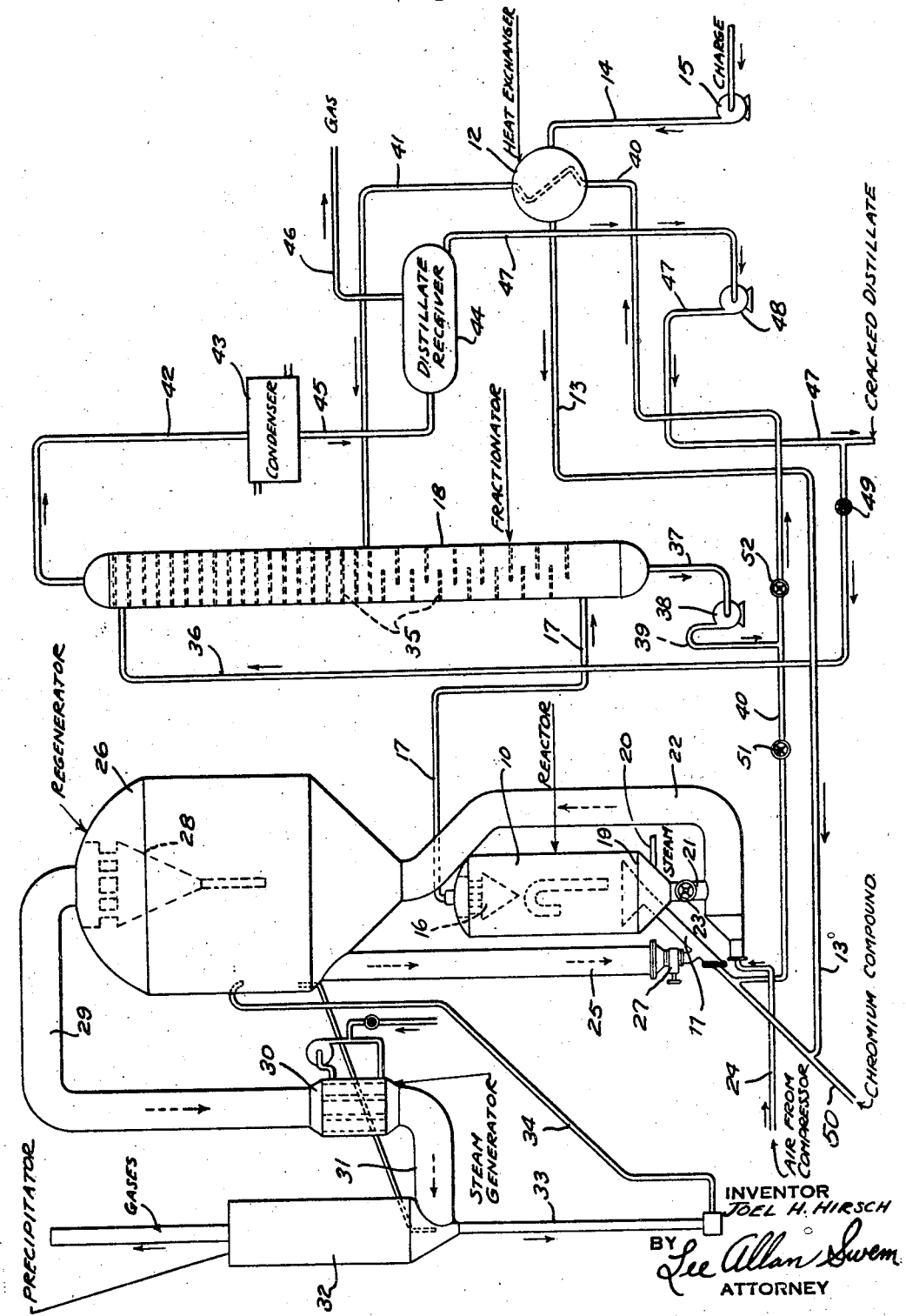

2,423,833

UNITED STATES PATENT OFFICE 2,423,833

FLUID CATALYTIC CONVERSION OF HYDROCARBON OILS

Joel H. Hirsch, Oakmont, Pa., assignor to Foster Wheeler Corporation, New York, N. Y., a corporation of New York Application August 19, 1944, Serial No. 550,173

9 Claims. (Cl. 196—52)

This invention relates to fluid catalytic conversion of hydrocarbon oils.

The present invention provides a method of fluid catalytic conversion of hydrocarbon oils in which naphthas are hydroformed without the presence of hydrogen and at relatively low pressures. The invention also provides a catalyst by means of which hydrocarbon oils are hydroformed without using hydrogen which catalyst is prepared in a minimum number of operations and at a low cost.

The invention will be understood from the following description when considered in connection with the accompanying drawing forming a part thereof and in which:

The single figure is a more or less diagrammatic view in elevation of the fluid catalytic conversion apparatus of the present invention.

Referring to the drawing, the reference character 10 designates a fluid catalyst reactor having an inlet pipe 11 through which vapor from a composite fluid to be cracked is injected. The inlet pipe 11 is in communication with a heat exchanger 12 through a feed conduit 13 and naphtha is fed into the heat exchanger 12 through a pipe 14 by means of a pump 15. The reactor 10 has a cyclone 16 at the top thereof through which cracked oil vapors pass in flowing overhead from the reactor 10 into the vapor conduit 17 which conduit is in communication at one end thereof with the top of the reactor 10 and at the other end with the lower portion of a fractionator 18. Catalyst fines are separated from the oil vapors in the cyclone 16. Spent catalyst flows downwardly from the reactor into a steam stripping section 19 at the bottom of the reactor 10 wherein oil vapors are stripped from the spent catalyst by steam entering section 19 at the bottom of the reactor 10 wherein oil vapors are stripped from the spent catalyst by steam entering section 19 through steam pipe 20. A spent catalyst standpipe 21 is in communication at one end thereof with the stripping section 19 and at the other end with spent catalyst conduit 22. The spent catalyst conduit 22 extends upwardly and communicates with the bottom of regenerator 26. Standpipe 21 is controlled by valve 23 so that the flow of spent catalyst from the stripping section 19 into the conduit 22 may be controlled. A current of regeneration air which conveys the spent catalyst through the conduit 22 to the regenerator is introduced into the conduit 22 from a compressor, not shown, through a pipe 24. A regenerated catalyst standpipe 25 communicates with the lower portion of the regenerator 26 and with the feed pipe 11. The amount of regenerated catalyst permitted to flow through the standpipe 25 is controlled by slide valve 27.

Flue gases from the regenerator 26 pass upwardly therein through a cyclone 28 wherein catalyst fines are separated from the gases. A flue gas pipe 29 receives gases from the cyclone 28 and, as shown, conducts the gases into a waste heat steam generator or boiler 30. Gases from the waste heat boiler 30 flow through a flue pipe 31 into a precipitator 32 wherein the remaining catalyst fines are separated from the gases. The precipitator 32 is in communication with the regenerator 26 through return conduits 33 and 34 through which the catalyst fines separated in the precipitator 32 are returned to the regenerator.

The vapors introduced into the fractionator 18 through the vapor conduit 17 pass upwardly in the fractionating tower through vapor and liquid contact apparatus 35 wherein said vapors flow in intimate contact with and countercurrent to reflux passing downwardly in the fractionator 18. The reflux enters the fractionator at the upper portion thereof through the reflux conduit 36. The slurry oil in the bottom of the fractionator 18 is removed through conduit 37 by means of the pump 38 which causes the slurry oil to flow through pipe 39 into line 40. The slurry oil, which contains some catalyst fines not removed by the cyclone 16, is passed through the line 40 into the inlet pipe 11 whence it flows with the feed charge into the reactor 10. Line 40 is also in communication with the heat exchanger 12 so that the slurry oil may be used as a heating medium for the naphtha feed charge. The quantity of slurry oil passed to the heat exchanger 12 and to the reactor 10 is controlled by valves 51 and 52. Heat exchanger 12 is in communication with the fractionator 18 at an intermediate point of the fractionating tower through a conduit 41 so that the slurry oil, after passing through the heat exchanger, is returned to the fractionator. Conduit 42 is in communication with the top of the fractionator 18 and with a condenser 43. Hydroformed gasoline and gases pass overhead from the fractionator 18 through the conduit 42 into the condenser 43. The condenser 43 communicates with a distillate receiver 44 through a pipe 45. Gases flow from the distillate receiver through a gas pipe 46 while distillate is withdrawn from the receiver 44 through a conduit 47 by a pump 48. The reflux conduit 36 communicates with the conduit 47 so that part of the distillate may be used as reflux in the fractionator 18. The reflux conduit 36 is controlled by valve 49.

The catalyst used in catalytically converting hydrocarbon oils in accordance with the present invention comprises Super-Filtrol (an acid activated bleaching earth) having a deposit of chromic oxide thereon. One method of producing such a catalyst is by impregnating Super-Filtrol with a chromium compound which is convertible to chromic oxide upon being decomposed by heat used in heating the catalyst. Another method of producing the catalyst of the present invention consists of injecting through the pipe 50 a chromium compound, which is convertible to chromic oxide upon being decomposed by heat. As shown, the solution enters the feed pipe 11 through the conduit 13 with which the pipe 50 is in communication. The stream of heated Super-Filtrol flowing through the standpipe 25 from the regenerator 26 decomposes the chromium compound upon coming into contact therewith in the feed pipe 11 thereby forming chromic oxide which is deposited on the Super-Filtrol. The chromium compound used in either one or both of the herein described methods may be, for example, a solution of chromium nitrate or chromic acid in water. When the solution of chromium nitrate or chromic acid and water is injected through the pipes 50 and 13 into the feed pipe 11, the water vaporizes upon contacting the hot Super-Filtrol causing the chromium nitrate or other chromium particles to be evenly distributed and deposited on the Super-Filtrol to thereafter form chromic oxide. The high temperature of the Super-Filtrol from the regenerator rapidly converts the chromium compound to chromic oxide.

In operation, a catalytic agent comprising Super-Filtrol impregnated with a chromium compound which is convertible to chromic oxide, is heated in the regenerator 26 decomposing the chromium compound to chromic oxide. The heated catalyst flows downwardly in the regenerated catalyst standpipe 25 into the feed pipe 11 where it comes into contact with the fluid to be converted. The fluid to be converted, as shown, consists of a mixture of the feed charge, which flows into the feed pipe 11 through the feed conduit 13, and slurry oil introduced into the conduit 13 through the line 40. The mixture of slurry oil and feed charge is vaporized upon contacting the hot catalyst and the vapors are injected into the reactor through the pipe 11. The re-formed naphtha vapors and gases pass overhead from the reactor through the cyclone 16 and through the conduit 17 while spent catalyst passes downwardly in the reactor through the steam stripping section 19 into and through the spent catalyst standpipe 21 and into the spent catalyst conduit 22 wherein it is conveyed upwardly to the regenerator 26 by means of regeneration air entering the conduit 22 through the pipe 24.

With the present invention, a catalyst by means of which hydrocarbon oils are hydroformed without the use of hydrogen may be prepared in a minimum number of operations. The catalyst is prepared merely by injecting a chromium compound convertible to chromic oxide into a hot stream of Super-Filtrol flowing from the regenerator to the reactor thereby converting the chromium compond to chromic oxide which is deposited on the Super-Filtrol.

It is also possible with the catalyst of the present invention to use a fluid catalytic cracking unit for the hydro-forming of hydrocarbon oils. Since the apparatus of the present invention comprises fluid catalytic cracking apparatus by means of which hydrocarbon oils are hydroformed, as distinguished from fixed bed hydroforming apparatus, a high ratio of catalyst to oil can be used which permits the hydroforming of hydrocarbon oils at a relatively low pressure and without using hydrogen.

It will be understood that the form of the invention disclosed is a preferred form only and that changes may be made in the several steps of the method and in their sequence without departing from the principles of the invention. Accordingly, the invention is not to be limited excepting by the scope of the appended claims.

What is claimed is:

1. A process for the fluid catalytic conversion of hydrocarbon oil which comprises heating Super-Filtrol in a catalyst regenerating zone, passing a stream of heated Super-Filtrol from the regenerating zone to a reaction zone, injecting a compound of chromium convertible to chromic oxide into said stream before passage of the stream into the reaction zone, said compound being converted to chromic oxide by contact with the hot Super-Filtrol and the chromic oxide deposited on the Super-Filtrol thereby producing a catalyst, thereafter flowing the catalyst and hydrocarbon oil to be converted into the catalytic reaction zone, and passing the spent catalyst from the reaction zone into the regenerating zone.

2. A process for the fluid catalytic conversion of hydrocarbon oil which comprises heating Super-Filtrol in a catalyst regenerating zone, passing a stream of heated Super-Filtrol from the regenerating zone to a reaction zone, injecting chromic acid into said stream before passage of the stream into the reaction zone, the chromic acid being converted to chromic oxide by contact with the hot Super-Filtrol and the chromic oxide deposited on the Super-Filtrol thereby providing a catalyst, thereafter flowing the catalyts and oil to be cracked into the catalytic reaction zone, and passing the spent catalyst from the reaction zone into the regenerating zone.

3. A process for the fluid catalytic conversion of hydrocarbon oil which comprises heating Super-Filtrol in a catalyst regenerating zone, passing a stream of heated Super-Filtrol from the regenerating zone to a reaction zone, injecting a solution of chromium nitrate and water into said stream before passage of the stream into the reaction zone, said solution being converted to chromic oxide by contact with the hot Super-Filtrol and the chromic oxide deposited on the Super-Filtrol thereby producing a catalyst, thereafter flowing the catalyst and oil to be cracked into a catalytic reaction zone, and passing the spent catalyst from the reaction zone into the regenerating zone.

4. A process for the fluid catalytic conversion of hydrocarbon oil which comprises heating acid-treated clay in a catalyst regenerating zone, flowing a stream of heated acid-treated clay from the regenerating zone to a reaction zone, injecting a compound of chromium convertible to chromic oxide into said flowing stream and into contact with said heated clay after said clay passes from the regenerating zone but before passage of the heated clay into the reaction zone, said compound being converted to chromic oxide by contact with said heated clay, the chromic oxide being deposited on said clay thereby producing a catalyst, and thereafter flowing the catalyst into the reaction zone.

5. A process for the conversion of hydrocarbon oil which comprises heating acid-treated clay in a catalyst regenerating zone, passing a stream of heated acid-treated clay from the regenerating zone to a reaction zone, injecting a compound of chromium convertible to chromic oxide into said stream and into contact with said heated clay before passage of the heated clay into the reaction zone, said compound being converted to chromic oxide by contact with said heated clay, the chromic oxide being deposited on said clay thereby producing a catalyst, thereafter flowing the catalyst into the reaction zone, and passing the spent catalyst from the reaction zone into the regenerating zone.

6. A process for the conversion of hydrocarbon oil which comprises heating acid-treated clay in a catalyst regenerating zone, passing a stream of heated acid-treated clay from the regenerating zone to a reaction zone, injecting a solution of water and a compound of chromium convertible to chromic oxide into said stream and into contact with said heated clay before passage of the heated clay into the reaction zone, said solution being converted to chromic oxide by contact with said heated clay, the chromic oxide being deposited on said clay thereby producing a catalyst, thereafter flowing the catalyst into the reaction zone, and passing the spent catalyst from the reaction zone into the regenerating zone.

7. A process for the fluid catalytic conversion of hydrocarbon oil which comprises heating an acid-treated bentonite catalyst support in a catalyst regenerating zone, passing a stream of said heated catalyst support from the regenerating zone to a reaction zone, injecting a promoter comprising a compound convertible to chromic oxide into said stream and into contact with said heated support before passage of the heated support into the reaction zone, said compound being converted to chromic oxide by contact with the heated support, the oxide being deposited on said support thereby producing a catalyst, thereafter flowing the catalyst into the reaction zone, and passing the spent catalyst from the reaction zone into the regenerating zone.

8. A process for the fluid catalytic conversion of hydrocarbon oil which comprises heating an acid treated clay type catalyst support in a catalyst regenerating zone, passing a stream of said heated catalyst support from the regenerating zone to a reaction zone, injecting chromic acid into said stream and into contact with said heated support before passage of the heated support into the reaction zone, said acid being converted into chromic oxide by contact with the heated support, the oxide being deposited on said support thereby producing a catalyst, thereafter flowing the catalyst into the reaction zone, and passing the spent catalyst from the reaction zone into the regenerating zone.

9. A process for the fluid catalytic conversion of hydrocarbon oil which comprises heating an acid treated clay type catalyst support in a catalyst regenerating zone, passing a stream of said heated catalyst support from the regenerating zone to a reaction zone, injecting a solution of chromium nitrate and water into said stream and into contact with said heated support before passage of the heated support into the reaction zone, said solution being converted to chromic oxide by contact with the heated support, the oxide being deposited on said support thereby producing a catalyst, thereafter flowing the catalyst into the reaction zone, and passing the spent catalyst from the reaction zone into the regenerating zone.

JOEL H. HIRSCH.

REFERENCES CITED

The following references are of record in the file of this patent:

UNITED STATES PATENTS

| Number | Name | Date |
| --- | --- | --- |
| 2,253,486 | Belchetz | Aug. 19, 1941 |
| 2,335,717 | Welty et al. | Nov. 30, 1943 |
| 2,340,974 | Myers | Feb. 8, 1944 |
| 2,343,852 | Grosse et al. | Mar. 7, 1944 |
| 2,348,576 | Seguy | May 9, 1944 |
| 2,349,574 | Conn | May 23, 1944 |
| 2,351,793 | Voorhees | June 20, 1944 |
| 2,353,399 | Herthel | July 11, 1944 |
| 2,353,505 | Scheineman | July 11, 1944 |
| 2,355,831 | Voorhees | Aug. 15, 1944 |